Feb. 6, 1951 D. L. HINGS 2,540,483
DETECTOR FED AUTOMATIC VOLUME CONTROL
Filed Aug. 6, 1945
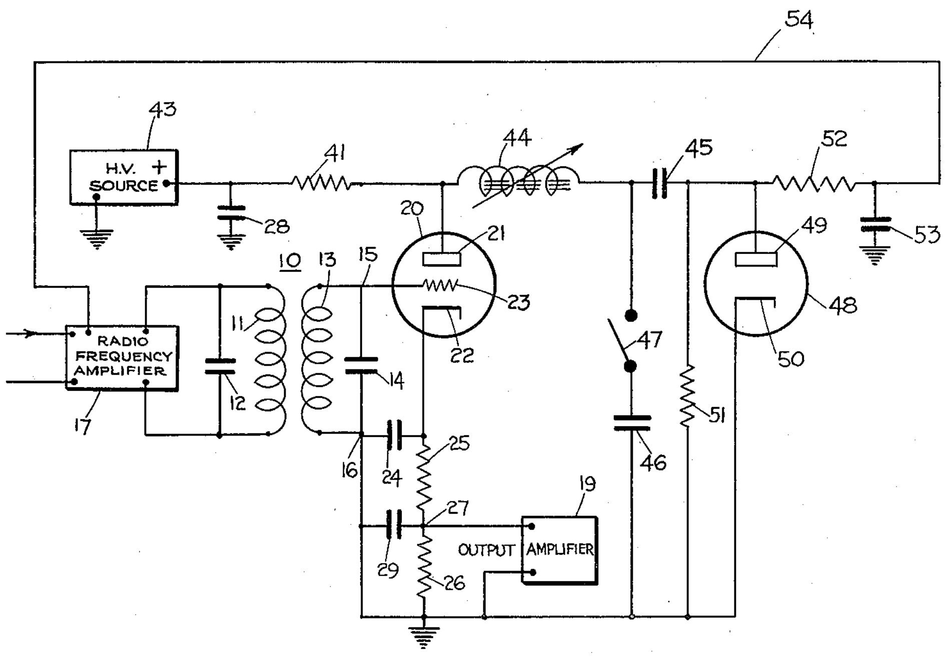
INVENTOR
Donald L. Hings
BY Stoodling and Krost
ATTORNEYS.

Patented Feb. 6, 1951 2,540,483

UNITED STATES PATENT OFFICE 2,540,483

DETECTOR FED AUTOMATIC VOLUME CONTROL

Donald L. Hings, Ottawa, Ontario, Canada, assignor, by mesne assignments, to Cornell-Dubilier Electric Corporation, South Plainfield, N. J., a corporation of Delaware Application August 6, 1945, Serial No. 609,264
In Canada July 20, 1945

9 Claims. (Cl. 250—20)

My invention relates in general to automatic volume control circuits and more particularly to an automatic volume control circuit fed by a triode detector tube.

An object of my invention is to connect an automatic volume control circuit to a triode detector tube in such a manner as to prevent distortion of the detected waves.

Another object of my invention is the provision of a series resonant output circuit connected between the plate of a triode detector and the plate of a diode rectifier for feeding the diode rectifier with energy from the triode detector, whereby the energy from the diode rectifier may be employed as the source for an automatic volume control circuit.

Other objects and a fuller understanding of my invention may be had by referring to the following description and claims, taken in conjunction with the accompanying drawing, in which the single figure represents a circuit embodying the features of my invention.

In the drawing, the reference character 10 represents a transformer having a primary winding 11 and a secondary winding 13 in which the primary winding is adapted to be energized by incoming modulated carrier waves from a radio frequency amplifier indicated by the block 17. A condenser 12 is connected across the primary winding 11 and constitutes, in combination with the primary winding, a resonant circuit which is tuned substantially to resonance at a frequency equal to the frequency of the incoming carrier waves. Similarly, a condenser 14 is connected across the secondary winding 13 and constitutes, in combination therewith, a resonant circuit which is tuned substantially to resonance at a frequency equal to the incoming carrier wave frequency. The energy from the transformer 10 is detected by a detector tube 20 having a plate 21, a cathode 22 and a grid 23 which is connected directly to the upper terminal 15 of the secondary winding 13 of the transformer 10. The grid 23 has infinite impedance with respect to ground. The cathode 22 is connected to the lower terminal 16 of the secondary winding 13 by a high frequency by-pass condenser 24. The cathode 22 is connected to ground through two resistors 25 and 26. The resistor 25 is a filter resistor and the resistor 26 is the detector load resistor. The condenser 29 is a high frequency by-pass filter condenser. The audio output of the detector is fed into the amplifier indicated by the block 19. One terminal of the amplifier 19 is connected to ground and the other terminal is connected to a tap 27 intermediate the two resistors 25 and 26. The plate 21 of the detector tube is connected to a high voltage source 43 through a plate high frequency impedance 41. The condenser 28 is a low frequency by-pass condenser.

The output from the plate 21 of the detector tube is adapted to be connected to a diode rectifier tube 48 having a plate 49 and a cathode 50. The diode rectifier tube 48 constitutes a potential source for the automatic volume control circuit. The cathode 50 of the diode rectifier is connected to ground. The resistor 51 is a diode load resistor and is connected between the plate 49 and the cathode 50. The resistor 52 is a filter resistor and is connected to ground by a low frequency by-pass condenser 53. The output of the plate 49 is fed through a conductor 54 to the radio frequency amplifier 17 for regulating the output of the radio amplifier 17 which supplies energy to the transformer 10.

The plate 21 of the detector tube 20 and the plate 49 of the diode rectifier tube 48 are interconnected by a high frequency plate load impedance element 44 and a direct current blocking condenser 45. The impedance element 44, in combination with the inter-electrode capacitance between the plate 49 and the cathode 50, constitutes a series resonant circuit. The impedance between the plate 21 and the ground is low and the impedance between the plate 49 and the ground is high. The tube 20, in order to function in its detector circuit, has a relatively low impedance load, whereas the diode rectifier 48 in the circuit as shown has a high impedance load. Thus, the load from the detector represents a current fed circuit and the load from the diode rectifier represents a voltage fed circuit. Inasmuch as the impedance element 44, in combination with the inter-electrode capacitance between the plate 49 and the cathode 50, functions as a series resonant circuit, I am able to operate the diode rectifier as a load from the detector tube without appreciable distortion, and thus my circuit may be characterized as a detector fed automatic volume control circuit. The load on the diode rectifier 48 causes substantially no distortion on the output of the detector tube 20. In a circuit made in accordance with my invention for a ten-volt radio frequency change on the grid 23, the plate high frequency voltage may change approximately one volt. The one-volt change on the plate 21 will produce in the neighborhood of six to eight volts change on the plate 49 of the diode rectifier 48. The selectivity and sensitivity of the detector tube may be increased by connecting the high potential end of the impedance element 44 to ground through a low capacity condenser 46 by closing the switch 47. The closing of the switch 47 may cause the radio frequency voltage on the plate 21 to increase from one volt to three to four volts when the element 44 is re-resonated. This increase of radio frequency voltage on the plate 21 introduces a re-generation in the grid circuit of the tube 20 by inter-electrode action for increasing the sensitivity and selectivity on weak signals when the bias is low. For strong signals, the re-generation is automatically reduced by the increase bias from the cathode load resistor 26. Thus, in my detector circuit, I have an automatic means of obtaining selectivity and sensitivity control of the tube 20 when the switch 47 is closed.

Although I have shown and described my invention with a certain degree of particularity, it is understood that changes may be made therein without departing from the spirit of the invention which are included within the scope of the claims hereinafter set forth.

I claim as my invention:

1. A detector circuit including a detector tube having a plate, a diode rectifier having a plate and a cathode, a high frequency impedance element inter-connecting the plate of the detector tube and the plate of the rectifier tube, the impedance element and the inter-electrode capacity between the plate and cathode of the rectifier tube constituting a low impedance series resonant circuit whereby the detector tube may feed energy to the rectifier tube.

2. An automatic volume control circuit including a diode rectifier having a plate and a cathode, a detector circuit including a detector tube having at least a plate, a cathode and a grid, means for exciting said grid and cathode of said detector tube, said detector tube circuit including a cathode biasing load resistor, an impedance element connected between the plate of the detector tube and the plate of the rectifier tube, a high impedance load connected to said rectifier tube, said impedance element and the inter-electrode capacity between the plate and the cathode of the rectifier tube comprising a low impedance series resonant circuit for preventing the load of the rectifier tube from causing a distortion of the wave energy in the cathode load biasing resistor.

3. An automatic volume control circuit comprising, a source of modulated radio frequency waves, a detector tube having an anode, a cathode and a control electrode, means for impressing said modulated radio frequency wave upon the control electrode-cathode path of said tube, a detector load resistor for supplying modulation energy to a load, said detector load resistor being connected in the anode-cathode path and the control electrode-cathode path of said detector tube, a rectifier tube having an anode and a cathode, inductive means interconnecting said two anodes, and a series resonant output circuit connected in the anode-cathode path of said detector tube, said series resonant output circuit consisting of substantially said inductive means and the inter-electrode capacity between the anode and cathode of said rectifier tube.

4. In combination with a radio frequency amplifier, a detector triode having a plate, grid and cathode, transfer means for exciting said grid and cathode with radio frequency energy from said radio frequency amplifier, a cathode load resistor connecting said cathode to ground, said cathode load resistor being the detector output of said detector triode, a diode rectifier having a plate and a cathode, an inductive element connecting said two plates, said diode cathode being connected to ground, said inductive element in combination with the inter-electrode capacity of said diode forming a substantially series resonant circuit to ground at said radio frequency, said series resonant circuit causing said triode plate to have a low impedance to ground, and connection means for connecting said diode plate to said radio frequency amplifier to control the gain thereof.

5. In combination with a radio frequency amplifier, a detector having a plate, means for operating said detector from said radio frequency amplifier, a load impedance for said detector, a diode rectifier having a plate and a cathode, an inductive element and a direct current blocking condenser interconnecting said two plates, means for directly connecting said diode cathode to ground, a diode load resistor connected across said diode plate and cathode, said inductive element in combination with the interelectrode capacity of said diode forming a substantially series resonant circuit to ground at the radio frequency of said radio frequency amplifier, said series resonant circuit causing said detector plate to have a low impedance to ground for preventing the load of the diode from causing any substantial distortion in the energy wave in said detector load impedance, a high impedance filter resistor interconnecting said diode plate and said radio frequency amplifier to supply an automatic volume control voltage thereto, and a low frequency bypass condenser connected to ground from the radio frequency amplifier end of said filter resistor.

6. In combination with a radio frequency amplifier, a detector having a plate, means for operating said detector from said radio frequency amplifier, a load impedance for said detector, a diode rectifier having a plate and a cathode, an inductive element and a direct current blocking condenser interconnecting said two plates, means for directly connecting said diode cathode to ground, a diode load resistor connected across said diode plate and cathode, a series resonant circuit resonant at said radio frequency for connecting said detector plate to ground, said series resonant circuit including said inductive element, said direct current blocking condenser and the interelectrode capacity of said diode, a condenser and a switch serially connected between ground and the point of interconnection of the inductive element and the direct current blocking condenser to form a part of said series resonant circuit upon closing of said switch, said series resonant circuit causing said detector plate to have a low impedance to ground for preventing the load of the diode from causing any substantial distortion in the energy wave in said detector load impedance, a high impedance filter resistor interconnecting said diode plate and said radio frequency amplifier to supply an automatic volume control voltage thereto, and a low frequency bypass condenser connected to ground from the radio frequency amplifier end of said filter resistor.

7. In combination with a radio frequency amplifier, an infinite input impedance detector having a plate, grid and cathode, means for exciting said grid and cathode with radio frequency energy from said radio frequency amplifier, a cathode load resistor connecting said cathode to ground, said cathode load resistor being the output of said detector, a diode rectifier having a plate and a cathode, an inductive element and a direct current blocking condenser interconnecting said two plates, means for directly connecting said diode cathode to ground, a diode load resistor connected across said diode plate and cathode, said inductive element in combination with the interelectrode capacity of said diode forming a substantially series resonant circuit to ground at the radio frequency of said radio frequency amplifier, said series resonant circuit causing said detector plate to have a low impedance to ground for preventing the load of the diode from causing any substantial distortion in the energy wave in said cathode load resistor, a high impedance filter resistor interconnecting said diode plate and said radio frequency amplifier to supply an automatic volume control voltage thereto, and a low frequency bypass condenser connected to ground from the radio frequency amplifier end of said filter resistor.

8. In combination with a radio frequency amplifier, an infinite input impedance detector having a plate, grid and cathode, means for exciting said grid and cathode with radio frequency energy from said radio frequency amplifier, a cathode load resistor connecting said cathode to ground, said cathode load resistor being the output of said detector, a diode rectifier having a plate and a cathode, an inductive element and a direct current blocking condenser interconnecting said two plates, means for directly connecting said diode cathode to ground, a diode load resistor connected across said diode plate and cathode, said inductive element in combination with the interelectrode capacity of said diode forming a substantially series resonant circuit to ground at the radio frequency of said radio frequency amplifier, a condenser and a switch serially connected between ground and the point of interconnection of the inductive element and the direct current blocking condenser to form a part of said series resonant circuit upon closing of said switch, said series resonant circuit causing said detector plate to have a low impedance to ground for preventing the load of the diode from causing any substantial distortion in the energy wave in said cathode load resistor, a high impedance filter resistor interconnecting said diode plate and said radio frequency amplifier to supply an automatic volume control voltage thereto, and a low frequency bypass condenser connected to ground from the radio frequency amplifier end of said filter resistor.

9. An automatic volume control circuit having a load and comprising, a detector circuit for detecting the modulation component of a carrier wave, an output circuit substantially series resonant at the frequency of said carrier wave, said output circuit including an inductance and rectifier means having electrodes, said substantial series resonance being achieved by the inductance and the interelectrode capacity of said rectifier means, and means for connecting said rectifier means to said load for supplying a rectified voltage to said load.

DONALD L. HINGS.

REFERENCES CITED

The following references are of record in the file of this patent:

UNITED STATES PATENTS

| Number | Name | Date |
|---|---|---|
| 1,511,015 | Affel | Oct. 7, 1924 |
| 2,115,825 | Morehouse | May 3, 1938 |
| 2,135,556 | Beanland | Nov. 8, 1938 |
| 2,253,450 | Travis | Aug. 19, 1941 |
| 2,273,144 | Roberts | Feb. 17, 1942 |
| 2,286,378 | Roberts | June 16, 1942 |
| 2,312,070 | Bliss | Feb. 23, 1943 |

FOREIGN PATENTS

| Number | Country | Date |
|---|---|---|
| 471,812 | Great Britain | Sept. 10, 1937 |